US008594993B2

(12) United States Patent
Qian et al.

(10) Patent No.: US 8,594,993 B2
(45) Date of Patent: Nov. 26, 2013

(54) FRAME MAPPING APPROACH FOR CROSS-LINGUAL VOICE TRANSFORMATION

(75) Inventors: Yao Qian, Beijing (CN); Frank Kao-Ping Soong, Beijing (CN)

(73) Assignee: Microsoft Corporation, Redmond, WA (US)

( * ) Notice: Subject to any disclaimer, the term of this patent is extended or adjusted under 35 U.S.C. 154(b) by 172 days.

(21) Appl. No.: 13/079,760

(22) Filed: Apr. 4, 2011

(65) Prior Publication Data

US 2012/0253781 A1 Oct. 4, 2012

(51) Int. Cl.
*G06F 17/28* (2006.01)
*G10L 13/00* (2006.01)

(52) U.S. Cl.
USPC ................................ 704/2; 704/216; 704/258

(58) Field of Classification Search
USPC ........................................ 704/2, 9, 258, 269
See application file for complete search history.

(56) References Cited

U.S. PATENT DOCUMENTS 5,111,409 A 5/1992 Gasper et al.
5,286,205 A 2/1994 Inouye et al.
5,358,259 A 10/1994 Best
5,486,872 A 1/1996 Moon
6,032,116 A 2/2000 Asghar et al.
6,062,863 A 5/2000 Kirksey et al.
6,199,040 B1 3/2001 Fette et al.
6,453,287 B1 9/2002 Unno et al.
6,665,643 B1 12/2003 Lande et al.
6,775,649 B1 8/2004 DeMartin
7,092,883 B1 8/2006 Gretter et al.
7,149,690 B2 12/2006 August et al.
7,496,512 B2 2/2009 Zhao et al.
7,562,010 B1 7/2009 Gretter et al.
7,574,358 B2 8/2009 Deligne et al.
7,603,272 B1 10/2009 Hakkani-Tur et al.
8,244,534 B2 8/2012 Qian et al.
2002/0029146 A1 3/2002 Nir
2003/0088416 A1 5/2003 Griniasty
2003/0144835 A1 7/2003 Zinser, Jr. et al.
2005/0057570 A1 3/2005 Cosatto et al.
2005/0228795 A1 10/2005 Shuster
2007/0033044 A1 2/2007 Yao
2007/0212670 A1 9/2007 Paech et al.

(Continued)

OTHER PUBLICATIONS

Y.-J. Wu and K. Tokuda "State mapping based method for cross-lingual speaker adaptation in HMM-based speech synthesis" Proc. Interspeech-09, pp. 528-531, 2009.*

(Continued)

*Primary Examiner* — Douglas Godbold
(74) *Attorney, Agent, or Firm* — Lee & Hayes, PLLC

(57) ABSTRACT

Frame mapping-based cross-lingual voice transformation may transform a target speech corpus in a particular language into a transformed target speech corpus that remains recognizable, and has the voice characteristics of a target speaker that provided the target speech corpus. A formant-based frequency warping is performed on the fundamental frequencies and the linear predictive coding (LPC) spectrums of source speech waveforms in a first language to produce transformed fundamental frequencies and transformed LPC spectrums. The transformed fundamental frequencies and the transformed LPC spectrums are then used to generate warped parameter trajectories. The warped parameter trajectories are further used to transform the target speech waveforms in the second language to produce transformed target speech waveform with voice characteristics of the first language that nevertheless retain at least some voice characteristics of the target speaker.

20 Claims, 7 Drawing Sheets

(56) References Cited

U.S. PATENT DOCUMENTS

| | | | | |
|---|---|---|---|---|
| 2007/0213987 | A1 | 9/2007 | Turk et al. | |
| 2007/0233490 | A1 | 10/2007 | Yao | |
| 2007/0276666 | A1 | 11/2007 | Rosec et al. | |
| 2008/0059190 | A1 | 3/2008 | Chu et al. | |
| 2008/0082333 | A1 | 4/2008 | Nurminen et al. | |
| 2008/0165194 | A1 | 7/2008 | Uranaka et al. | |
| 2008/0195381 | A1 | 8/2008 | Soong et al. | |
| 2009/0006096 | A1 | 1/2009 | Li et al. | |
| 2009/0048841 | A1 | 2/2009 | Pollet et al. | |
| 2009/0055162 | A1 | 2/2009 | Qian et al. | |
| 2009/0171657 | A1 * | 7/2009 | Tian et al. | 704/219 |
| 2009/0248416 | A1 | 10/2009 | Gorin et al. | |
| 2009/0258333 | A1 | 10/2009 | Yu | |
| 2009/0297029 | A1 | 12/2009 | Cazier | |
| 2009/0310668 | A1 | 12/2009 | Sackstein et al. | |
| 2010/0057455 | A1 | 3/2010 | Kim et al. | |
| 2010/0057467 | A1 | 3/2010 | Wouters | |
| 2010/0076762 | A1 | 3/2010 | Cosatto et al. | |
| 2010/0082345 | A1 | 4/2010 | Wang et al. | |
| 2010/0211376 | A1 | 8/2010 | Chen et al. | |
| 2012/0143611 | A1 | 6/2012 | Qian et al. | |

OTHER PUBLICATIONS

Black, et al., "CMU Blizzard 2007: A Hybrid Acoustic Unit Selection System from Statistically Predicted Parameters", retrieved on Aug. 9, 2010 at <<http://www.cs.cmu.edu/~awb/papers/bc2007/blz3__005.pdf>>, The Blizzard Challenge, Bonn, Germany, Aug. 2007, pp. 1-5.

Black, et al., "Statistical Parametric Speech Synthesis", retrieved on Aug. 9, 2010 at <<http://www.cs.cmu.edu/~awb/papers/icassp2007/0401229.pdf>>, IEEE Proceedings of International Conference on Acoustics, Speech and Signal Processing (ICASSP), vol. 4, Apr. 2007, pp. 1229-1232.

Colotte et al., "Linguistic Features Weighting for a Text-To-Speech System Without Prosody Model", http://citeseerx.ist.psu.edu/viewdoc/download?doi=10.1.1.70.5121&rep=rep1&type=pdf, Interspeech 2005, Sep. 2005, 4 pgs.

Dimitriadis, et al., "Towards Automatic Speech Recognition in Adverse Environments", retrieved at <<http://www.aueb.gr/pympe/hercma/proceedings2005/H05-FULL-PAPERS-1/DIMITRIADIS-KATSAMANIS-MARAGOS-PAPANDREOU-PITSIKALIS-1.pdf>>, WNSP05, Nonlinear Speech Processing Workshop, Sep. 2005, 12 pages.

Doenges, et al., "MPEG-4: Audio/Video & Synthetic Graphics/Audio for Mixed Media", Signal Processing: Image Communication, vol. 9, Issue 4, May 1997, pp. 433-463.

Erro, et al., "Frame Alignment Method for Cross-Lingual Voice Conversion", retrieved at <<http://gps-tsc.upc.es/veu/research/pubs/download/err__fra__07.pdf>>, INTERSPEECH 2007, 8th Annual Conference of the International Speech Communication Association, Aug. 2007, 4 pages.

Fernandez et al., "The IBM Submission to the 2008 Text-to-Speech Blizzard Challenge", Proc Blizzard Workshop, Sep. 2008, 6 pgs.

Gao, et al., "IBM Mastor System: Multilingual Automatic Speech-to-speech Translator", retrieved on Aug. 9, 2010 at <<http://www.aclweb.org/anthology/W/W06/W06-3711.pdf>>, Association for Computational Linguistics, Proceedings of Workshop on Medical Speech Translation, New York, NY, May 2006, pp. 53-56.

Gonzalvo, et al., "Local minimum generation error criterion for hybrid HMM speech synthesis", retrieved on Aug. 9, 2010 at <<http://serpens.salleurl.edu/intranet/pdf/385.pdf>>, ISCA Proceedings of INTERSPEECH, Brighton, UK, Sep. 2009, pp. 416-419.

Govokhina, et al., "Learning Optimal Audiovisual Phasing for an HMM-based Control Model for Facial Animation", retrieved on Aug. 9, 2010 at <<http://hal.archives-ouvertes.fr/docs/00/16/95/76/PDF/og__SSW07.pdf>>, Proceedings of ISCA Speech Synthesis Workshop (SSW), Bonn, Germany, Aug. 2007, pp. 1-4.

Hirai et al., "Utilization of an HMM-Based Feature Generation Module in 5 ms Segment Concatenative Speech Synthesis", SSW6-2007, Aug. 2007, pp. 81-84.

Huang et al., "Recent Improvements on Microsoft's Trainable Text-to-Speech System-Whistler", Proc ICASSP1997, Apr. 1997, vol. 2, 4 pgs.

Kawai et al., "XIMERA: a concatenative speech synthesis system with large scale corpora", IEICE Trans. J89-D-II, No. 12, Dec. 2006, pp. 2688-2698.

Kuo, et al., "New LSP Encoding Method Based on Two-Dimensional Linear Prediction", IEEE Proceedings of Communications, Speech and Vision, vol. 10, No. 6, Dec. 1993, pp. 415-419.

Laroia, et al., "Robust and Efficient Quantization of Speech LSP Parameters Using Structured Vector Quantizers", retrieved on Aug. 9, 2010 at <<http://ieeexplore.ieee.org/stamp/stamp.jsp?tp=&arnumber=150421>>, IEEE Proceedings of International Conference on Acoustics, Speech and Signal Processing (ICASSP), May 1991, pp. 641-644.

Liang, et al. "An HMM-Based Bilingual (Mandarin-English) TTS", retrieved at <<http://www.isca-speech.org/archive__open/ssw6/ssw6__137.html>>6th ISCA Workshop on Speech Synthesis, Aug. 2007, pp. 137-142.

Ling, et al., "HMM-Based Hierarchical Unit Selection Combining Kullback-Leibler Divergence with Likelihood Criterion", retrieved on Aug. 9, 2010 at <<http://ispl.korea.ac.kr/conference/ICASSP2007/pdfs/0401245.pdf>>, IEEE Proceedings of International Conference on Acoustics, Speech and Signal Processing (ICASSP), vol. 4, Apr. 2007, pp. 1245-1248.

McLoughlin, et al., "LSP Analysis and Processing for Speech Coders", IEEE Electronics Letters, vol. 33, No. 9, Apr. 1997, pp. 743-744.

Nukaga et al., "Unit Selection Using Pitch Synchronous Cross Correlation for Japanese Concatenative Speech Synthesis", <<http://www.ssw5.org/papers/1033.pdf>>, 5th ISCA Speech Synthesis Workshop, Jun. 2004, pp. 43-48.

Paliwal, "A Study of LSF Representation for Speaker-Dependent and Speaker-Independent HMM-Based Speech Recognition Systems", International Conference on Acoustics, Speech, and Signal Processing (ICASSP-90), Apr. 1990, pp. 801-804.

Paliwal, "On the Use of line Spectral Frequency Parameters for Speech Recognition", Digital Signal Processing, vol. 2, No. 2, Apr. 1992, pp. 80-87.

Pellom, et al., "An Experimental Study of Speaker Verification Sensitivity to Computer Voice-Altered Imposters", IEEE ICASSP-99: Inter. Conf. on Acoustics, Speech, and Signal Processing, vol. 2, Mar. 1999, pp. 837-840.

Perng, et al., "Image Talk: A Real Time Synthetic Talking Head Using One Single Image with Chinese Text-To-Speech Capability", Pacific Conference on Computer Graphics and Applications, Oct. 29, 1998, 9 pages.

Plumpe, et al., "HMM-Based Smoothing for Concatenative Speech Synthesis", retrieved on Aug. 9, 2010 at <<http://research.microsoft.com/pubs/77506/1998-plumpe-icslp.pdf>>, Proceedings of International Conference on Spoken Language Processing (ICSLP), Sydney, Australia, vol. 6, Dec. 1998, pp. 2751-2754.

Quian et al., "A Minimum V/U Error Approach to F0 Generation in HMM-Based TTS," INTERSPEECH-2009, Sep. 2009, pp. 408-411.

Qian, et al., "An HMM Trajectory Tiling (HTT) Approach to High Quality TTS", retrieved at <<http://festvox.org/blizzard/bc2010/MSRA__%20Blizzard2010.pdf>>, Microsoft Entry to Blizzard Challenge 2010, Sep. 25, 2010, 5 pages.

Qian et al., "An HMM-Based Mandarin Chinese Text-To-Speech System ," ISCSLP 2006, Springer LNAI vol. 4274, Dec. 2006 , pp. 223-232.

Sirotiya, et al., "Voice Conversion Based on Maximum-Likelihood Estimation of Speech Parameter Trajectory", retrieved on Nov. 17, 2010 at <<http://ee602.wdfiles.com/local—files/report-presentations/Group__14, Indian Institute of Technology, Kanpur, Apr. 2009, 8 pages.

Soong, et al., "Line Spectrum Pair (LSP) and Speech Data Compression", retrieved on Aug. 9, 2010 at <<http://ieeexplore.ieee.org/stamp/stamp.jsp?tp=&arnumber=1172448>>, IEEE Proceedings of Acoustics, Speech, and Signal Processing (ICASSP), vol. 1, San Diego, CA, Mar. 1984, pp. 1.10.1-1.10.4.

Soong, et al., "Optimal Quantization of LSP Parameters", IEEE Transactions on Speech and Audio Processing, vol. 1, No. 1, Jan. 1993, pp. 15-24.

(56) References Cited

OTHER PUBLICATIONS

Sugamura, et al., “Quantizer Design in LSP Speech Analysis and Synthesis”, 1988 International Conference on Acoustics, Speech, and Signal Processing, vol. 1, Apr. 1988, pp. 398-401.

SynSIG, “Blizzard Challenge 2010”, retrieved on Aug. 9, 2010 at <<http://www.synsig.org/index.php/Blizzard_Challenge_2010>>, International Speech Communication Association (ISCA), SynSIG, Aug. 2010, pp. 1.

Toda, et al., “Speech Parameter Generation Algorithm Considering Global Variance for HMM-Based Speech Synthesis”, retrieved on Aug. 9, 2010 at <<http://spalab.naist.jp/~tomoki/Tomoki/Conferences/IS2005_HTSGV.pdf>>, Proceedings of INTERSPEECH, Lisbon, Portugal, Sep. 2005, pp. 2801-2804.

Toda, et al., “Trajectory training considering global variance for Hmm-based speech synthesis”, Proceeding ICASSP ’09, Apr. 2009, pp. 4025-4028.

Toda, et al., “Voice Conversion Based on Maximum-Likelihood Estimation of Spectral Parameter Trajectory”, IEEE Transactions on Audio, Speech, and Language Processing, vol. 15, No. 8, Nov. 2007, pp. 2222-2235.

Tokuda et al., “Multispace Probability Distribution HMM”, IEICE Trans Inf & System, vol. E85-D, No. 3, Mar. 2002, pp. 455-464.

Tokuda, et al., “Speech Parameter Generation Algorithms for HMM-Based Speech Synthesis”, retrieved on Aug. 9, 2010 at <<http://ieeexplore.ieee.org/stamp/stamp.jsp?tp=&arnumber=861820>>, IEEE Proceedings of International Conference on Acoustics, Speech and Signal Processing (ICASSP), Istanbul, Turkey, Jun. 2000, pp. 1315-1318.

Wang et al., “Trainable Unit Selection Speech Synthesis Under Statistical Framework”, <<http://www.scichina.com:8080/kxtbe/fileup/PDF/09ky1963.pdf>>, Chinese Science Bulletin, Jun. 2009, 54: 1963-1969.

Wu, “Investigations on HMM Based Speech Synthesis” , Ph.D. dissertation, Univ of Science and Technology of China, Apr. 2006, 117 pages.

Wu, et al., “Minimum Generation Error Criterion Considering Global/Local Variance for HMM-Based Speech Synthesis”, retrieved on Aug. 9, 2010 at <<http://ieeexplore.ieee.org/stamp/stamp.jsp?arnumber=04518686>>, IEEE International Conference on Acoustics, Speech and Signal Processing (ICASSP), Las Vegas, NV, Apr. 3, 2008, pp. 4621-4624.

Wu, et al., “Minimum Generation Error Training for HMM-Based Speech Synthesis”, retrieved on Aug. 9, 2010 at <<http://ieeexplore.ieee.org/stamp/stamp.jsp?tp=&arnumber=1659964>>, IEEE Proceedings of International Conference on Acoustics, Speech and Signal Processing (ICASSP), vol. 1, May 2006, pp. 89-92.

Yan, et al., “Rich Context Modeling for High Quality HMM-Based TTS”, retrieved on Aug. 9, 2010 at <<https://wiki.inf.ed.ac.uk/twiki/pub/CSTR/Speak08To09/IS090714.PDF>>, ISCA Proceedings of INTERSPEECH, Brighton, UK, Sep. 2009, pp. 1755-1758.

Yan, et al., “Rich-context unit selection (RUS) approach to high quality TTS”, retrieved on Aug. 10, 2010 at <<http://ieeexplore.ieee.org/stamp/stamp.jsp?tp=&arnumber=5495150>>, IEEE Proceedings of International Conference on Acoustics, Speech and Signal Processing (ICASSP), Mar. 2010, pp. 4798-4801.

Yoshimura, et al., “Simultaneous Modeling of Spectrum, Pitch and Duration in HMM-Based Speech Synthesis”, retrieved on Aug. 9, 2010 at <<http://www.sp.nitech.ac.jp/~tokuda/selected_pub/pdf/conference/yoshimura_eurospeech1999.pdf>>, Proceedings of Eurospeech, vol. 5, Sep. 1999, pp. 2347-2350.

Young, et al., “The HTK Book”, Cambridge University Engineering Department, Dec. 2001 Edition, 355 pages.

Liang et al., “A Cross-Language State Mapping Approach to Bilingual (Mandarin-English) TTS”, IEEE International Conference on Accoustics, Speech and Signal Processing, 2008, ICASSP 2008, Mar. 31-Apr. 4, 2008, 4 pages.

Nose et al., “A Speaker Adaptation Technique for MRHSMM-Based Style Control of Synthetic Speech,” IEEE International Conference on Acoustics, Speech and Signal Processing, 2007, ICASSIP 2007, Apr. 15-20, 2007, vol. 4, 4 pages.

Office action for U.S. Appl. No. 12/629,457, mailed on May 15, 2012, Inventor #1, “Rich Context Modeling for Text-To-Speech Engines”, 9 pages.

Qian et al. “A Cross-Language State Sharing and Mapping Approach to Bilingual (Mandarian-English) TSS”, IEEE Transactions on Audio, Speech, and Language Processing, Aug. 2009, vol. 17, Issue 6, 9 pages.

Qian et al, “HMM-based Mixed-language(Mandarian-English) Speech Synthesis”, 6th INternational Symposium on Chinese Spoken Language Processing, 2008, ISCSLP ’08. Dec. 2008, 4 pages.

Do2learn, “Educational Resources for Special Needs”, Web Archive, Sep. 23, 2009 retrieved at <<http://web.archive.org/web/20090923183110/http://www.do2learn.com/organizationaltools/EmotionsColorWheel/overview.htm>>, 1 page.

Office action for U.S. Appl. No. 13/098,217, mailed on Dec. 10, 2012, Chen et al., “Talking Teacher Visualization for Language Learning”, 17 pages.

Office action for U.S. Appl. No. 13/098,217, mailed on Mar. 26, 2013, Chen et al., “Talking Teacher Visualization for Language Learning”, 24 pages.

Office action for U.S. Appl. No. 13/098,217, mailed on Jul. 10, 2013, Chen et al., “Talking Teacher Visualization for Language Learning”, 24 pages.

* cited by examiner

FRAME MAPPING APPROACH FOR CROSS-LINGUAL VOICE TRANSFORMATION

BACKGROUND

Cross-lingual voice transformation is the process of transforming the characteristics of a speech uttered by a source speaker in one language (L1 or first) into speech which sounds like speech uttered by a target speaker by using the speech data of the target speaker in another language (L2 or second). In this way, cross-lingual voice transformation may be used to render the target speaker's speech in a language that the target speaker does not actually speak.

Conventional cross-lingual voice transformations may rely on the use of phonetic mapping between a source language and a target language according to the International Phonetic Alphabet (IPA), or acoustic mapping using a statistical measure such as the Kullback-Leibler Divergence (KLD). However, phonetic mapping or acoustic mapping between certain language pairs, such as English and Mandarin Chinese, may be difficult due to phonetic and prosodic differences between the language pairs. As a result, cross-lingual voice transformation based on the use of phonetic mapping or acoustic mapping may yield synthesized speech that is unnatural sounding and/or unintelligible for certain language pairs.

SUMMARY

Described herein are techniques that use a frame mapping-based approach to cross-lingual voice transformation. The frame mapping-based approach for cross-lingual voice transformation may include the use of formant-based frequency warping for vocal tract length normalization (VTLN) between the speech of a target speaker and the speech of a source speaker, and the use of speech trajectory tiling to generate target speaker's speech in source speaker's language. The frame mapping-based cross-lingual voice transformation techniques, as described herein, may facilitate speech-to-speech translation, in which the synthesized output speech of a speech-to-speech translation engine retains at least some of the voice characteristics of the input speech spoken by the speaker, but in which the synthesized output speech is in a different language than the input speech. The frame mapping-based cross-lingual voice transformation may also be applied for computer-assisted language learning, in which the synthesized output speech is in a language that is foreign to a learner, but which is synthesized using captured speech spoken by the learner and so has the voice characteristics of the learner.

In at least one embodiment, a formant-based frequency warping is performed on the fundamental frequencies and the linear predictive coding (LPC) spectrums of source speech waveforms in a first language to produce transformed fundamental frequencies and transformed LPC spectrums. The transformed fundamental frequencies and the transformed LPC spectrums are then used to generate warped parameter trajectories. The warped parameter trajectories are further used to transform the target speech waveforms in the second language to produce transformed target speech waveform with voice characteristics of the first language that nevertheless retains at least some voice characteristics of the target speaker.

This Summary is provided to introduce a selection of concepts in a simplified form that is further described below in the Detailed Description. This Summary is not intended to identify key features or essential features of the claimed subject matter, nor is it intended to be used to limit the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The embodiments described herein pertain to the use of a frame mapping-based approach for cross-lingual voice transformation. The frame mapping-based cross-lingual voice transformation may include the use of formant-based frequency warping for vocal tract length normalization (VTLN) and the use of speech trajectory tiling. The formant-based frequency warping may warp spectral frequency scale of a source speaker's speech data onto the speech data of a target speaker to improve the output voice quality of any speech resulting from the cross-lingual voice transformation. The speech trajectory tiling approach optimizes the selection of waveform units from the speech data of the target speaker that match the waveform units of the source speaker based on spectrum, duration, and pitch similarities in the two sets of speech data, thereby further improving the voice quality of any speech that results from the cross-lingual voice transformation.

Thus, by using the transformed speech data of the target speaker as produced by the frame mapping-based cross-lingual voice transformation techniques described herein, a speech-to-speech translation engine may synthesize natural sounding output speech in a first language from input speech in a second language that is obtained from the target speaker. However, the output speech that is synthesized bears voice resemblance to the input speech of the target speaker. Likewise, by using the transformed speech data, a text-to-speech engine may synthesize output speech in a foreign language from an input text, in which the output speech nevertheless retains a certain voice resemblance to the speech of the target speaker.

Further, the synthesized output speech from such engines may be more natural than synthesized speech that is produced using conventional cross-lingual voice transformation techniques. As a result, the use of the frame mapping-based cross-lingual voice transformation techniques described herein may increase user satisfaction with embedded systems, server system, and other computing systems that present information via synthesized speech. Various examples of the frame mapping-based cross-lingual voice transformation approach, as well as speech synthesis based on such an approach in accordance with the embodiments are described below with reference to FIGS. 1-7.

Example Scheme

Figure 1:
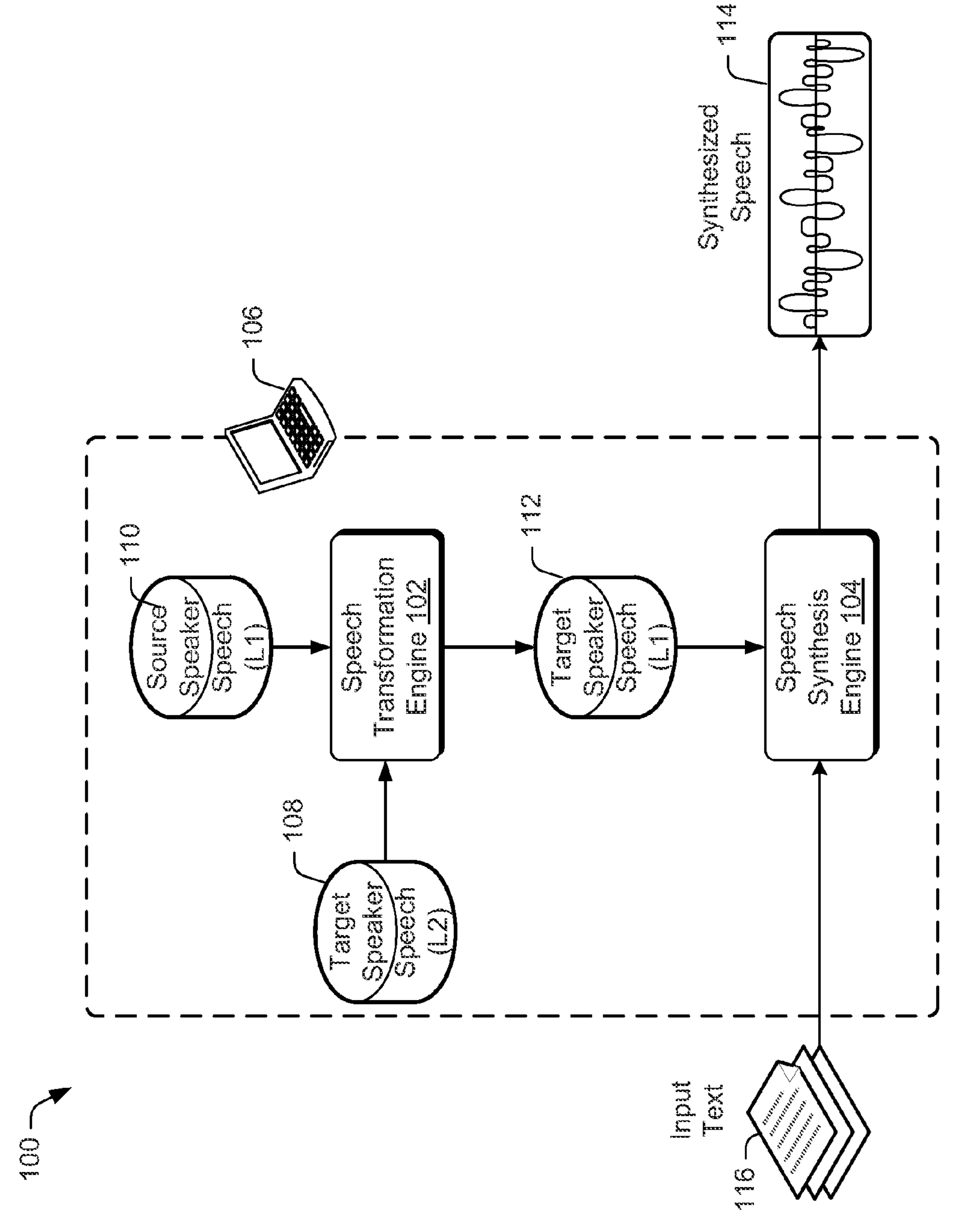
FIG. 1 is a block diagram that illustrates an example scheme that implements speech synthesis using frame mapping-based cross-lingual voice transformation.

FIG. 1 is a block diagram that illustrates an example scheme 100 that implements speech synthesis using frame mapping-based cross-lingual voice transformation. The example scheme 100 may be implemented by a speech transformation engine 102 and a speech synthesis engine 104 that are operating on an electronic device 106. The speech transformation engine 102 may transform the voice characteristics of a speech corpus 108 provided by a target speaker in a target language (L2) based on voice characteristics of a speech corpus 110 provided by a source speaker in the source language (L1). The transformation may result in a transformed target speaker speech corpus 112 that takes on the voice characteristics of the source speaker speech corpus 110. However, the transformed target speaker speech corpus 112 is nevertheless recognizable as retaining at least some voice characteristics of the speech provided by the target speaker.

As an illustrative example, the source speaker speech corpus 110 may include speech waveforms of North American-Style English as spoken by a first speaker, which the target speaker speech corpus 108 may include speech waveforms of Mandarin Chinese as spoken by a second speaker. Speech waveforms are a repertoire of speech utterance units for a particular language. The speech waveforms in each speech corpus may be concatenated into a series of frames of a predetermined duration (e.g., 5 ms, one state, half-phone, one phone, diphone, etc.). For instance, a speech waveform may be in the form of a Wave Form Audio File Format (WAV) file that contains three seconds of speech, and the three seconds of speech may be further divided into a series of frames that are 5 milliseconds (ms) in duration.

The speech synthesis engine 104 may use the transformed target speaker speech corpus 112 to generate synthesized speech 114 based on input text 116. The synthesized speech 114 may have the voice characteristics of the source speaker who provided the speech corpus 110 in the source language, but is nevertheless recognizable as retaining at least some voice characteristics of the speech of the target speaker, despite the fact that the target speaker may be incapable of speaking the source language in real life.

Figure 2:
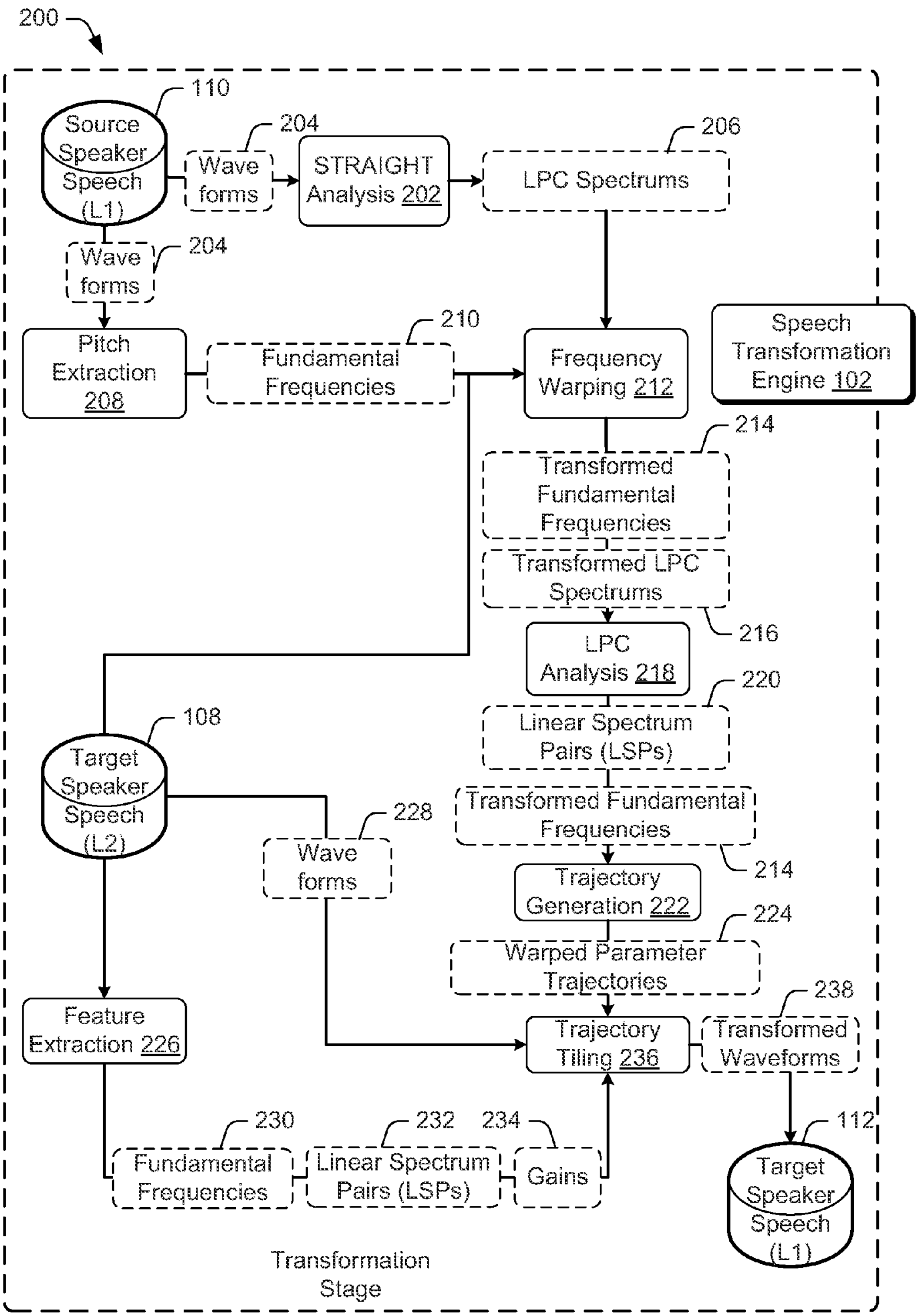
FIG. 2 is a block diagram that illustrates a speech transformation stage that is performed by a speech transformation engine.

FIG. 2 is a block diagram that illustrates a speech transformation stage 200 that is performed by the speech transformation engine 102. During the speech transformation stage 200, the speech transformation engine 102 may use the source speaker speech corpus 110 with the voice characteristics of a first language (L1) to transform a target speaker speech corpus 108 with the voice characteristics of a second language (L2) into a transformed target speaker speech corpus 112 that acquires voice characteristics of the first language (L1).

The speech transformation engine 102 may initially perform a Speech Transformation and Representation using Adaptive Interpolation of Weighted Spectrum (STRAIGHT) analysis 202 on the source speech waveforms 204 that are stored in the source speaker speech corpus 110. The STRAIGHT analysis 202 may provide the linear predictive coding (LPC) spectrums 206 corresponding to the source speech waveforms 204. In various embodiments, the STRAIGHT analysis 202 may be performed using a STRAIGHT speech analysis tool that is an extension of a simple channel-vocoder that decomposes input speech signals into warped parameters and spectral parameters.

Speech transformation engine 102 may also perform pitch extraction 208 on the source speech waveforms 204 to extract the fundamental frequencies 210 of the source speech waveforms 204. Following the pitch extraction 208, the speech transformation engine 102 may further performs a formant-based frequency warping 212 based on the fundamental frequencies 210 and the LPC spectrums 206 of the source speech waveforms 204.

In various embodiments, the formant-based frequency warping 212 may warp the spectrum of the waveforms 118 as contained in the LPC spectrums 206 and the fundamental frequencies 210 onto the target speaker speech corpus 108. In this way, the formant-based frequency warping 212 may generate transformed fundamental frequencies 214 and transformed LPC spectrums 216.

Subsequently, the speech transformation engine 102 may perform LPC analysis 218 on the transformed LPC spectrums 216 to obtain corresponding line spectrum pairs (LSPs) 220. Thus, warped source speaker data in the form of transformed fundamental frequencies 214 and the LSPs 220 may be generated by the speech transformation engine 102. At trajectory generation 222, the speech transformation engine 102 may generate warped parameter trajectories 224 based on the LSPs 220 and the transformed LPC spectrums 216, so that each of the transformed trajectories encapsulates the corresponding LSP and the corresponding transformed fundamental frequency information.

Further, the speech transformation engine 102 may perform feature extraction 226 on the target speaker speech corpus 108. The target speaker speech corpus 108 may include target speech waveforms 228, and the feature extraction 226 may obtain fundamental frequencies 230, LSPs 232, and gains 234 for the frames in the target speech waveforms 228.

At trajectory tiling 236, the speech transformation engine 102 may use each of the warped parameter trajectories 224 as a guide to select frames of target speech waveforms 228 from the target speaker speech corpus 108. Each frame from the target speech waveforms 228 may be represented by data in a corresponding fundamental frequency 230, data in a corresponding LSP 232, and data in a corresponding gain 234 that are obtained during feature extraction 226. Once the frames are selected for a warped parameter trajectory 224, the speech transformation engine 102 may further concatenate the selected frames to produce a corresponding speech waveform. In this way, the speech transformation engine 102 may produce transformed speech waveforms 238 that constitute the transformed target speaker speech corpus 112. As described above, the transformed target speaker speech corpus 112 may have the voice characteristics of the first language (L1), even though the original target speaker speech corpus 108 has the voice characteristics of a second language (L2).

Figure 3:
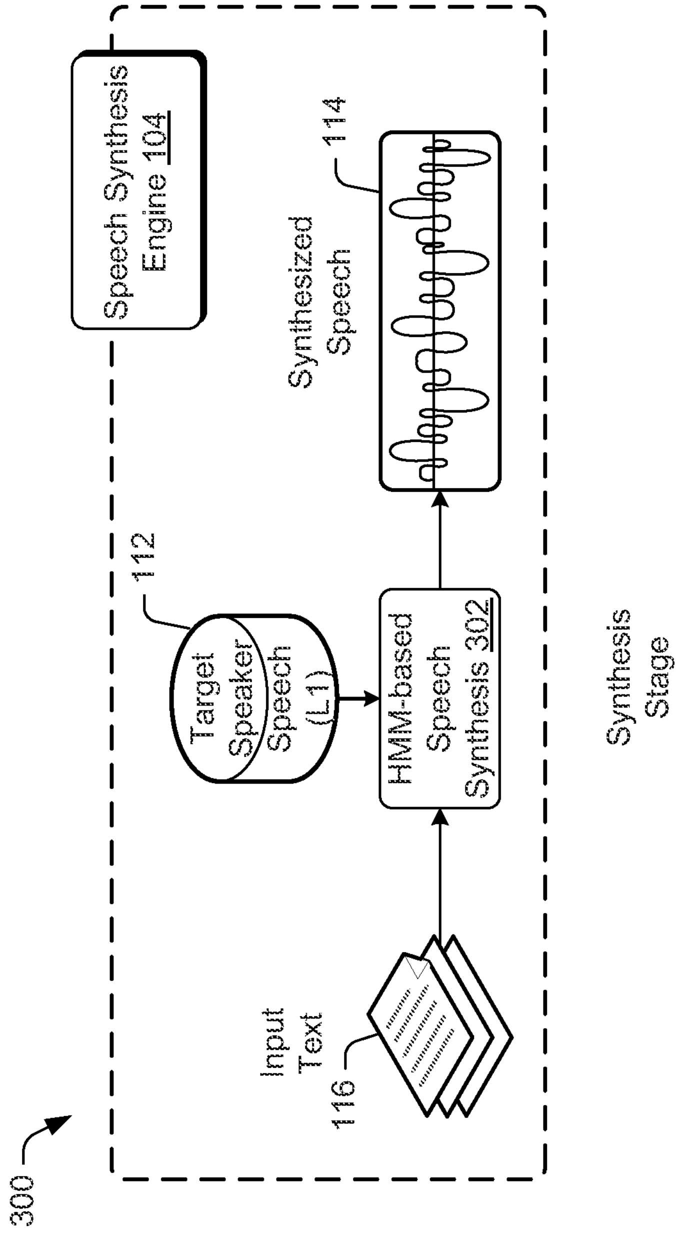
FIG. 3 is a block diagram that illustrates a speech synthesis stage that is performed by the speech synthesis engine.

FIG. 3 is a block diagram that illustrates a speech synthesis stage 300 that is performed by the speech synthesis engine 104. During the speech synthesis stage 300, the speech synthesis engine 104 may use the transformed target speaker speech corpus 112 as training data for HMM-based text-to-speech synthesis 302. In other words, the speech synthesis engine 104 may use the transformed target speaker speech corpus 112 to train a set of HMMs. The speech synthesis engine 104 may then use the trained HMMs to generate the synthesized speech 114 from the input text 116. Accordingly, the synthesized speech 114 may resembles natural speech spoken by the target speaker, but which acquires the voice characteristics of the first language (L1), despite the fact that the target speaker does not have the ability to speak the first language (L1). Such voice characteristic transformation may be useful in several different applications. For example, in the context of language learning, the target speaker who only speaks a native language may wish to learn to speak a foreign language. As such, the input text 116 may be a written text in the foreign language that the target speaker desires to annunciate. Thus, by the using the HMM-based speech synthesis 302, the speech synthesis engine 104 may generate synthesized speech 114 in the foreign language that resembles the speech of the target speaker in the native language, but which has the voice characteristics (e.g., pronunciation and/or tone quality) of the foreign language.

Example Components

Figure 4:
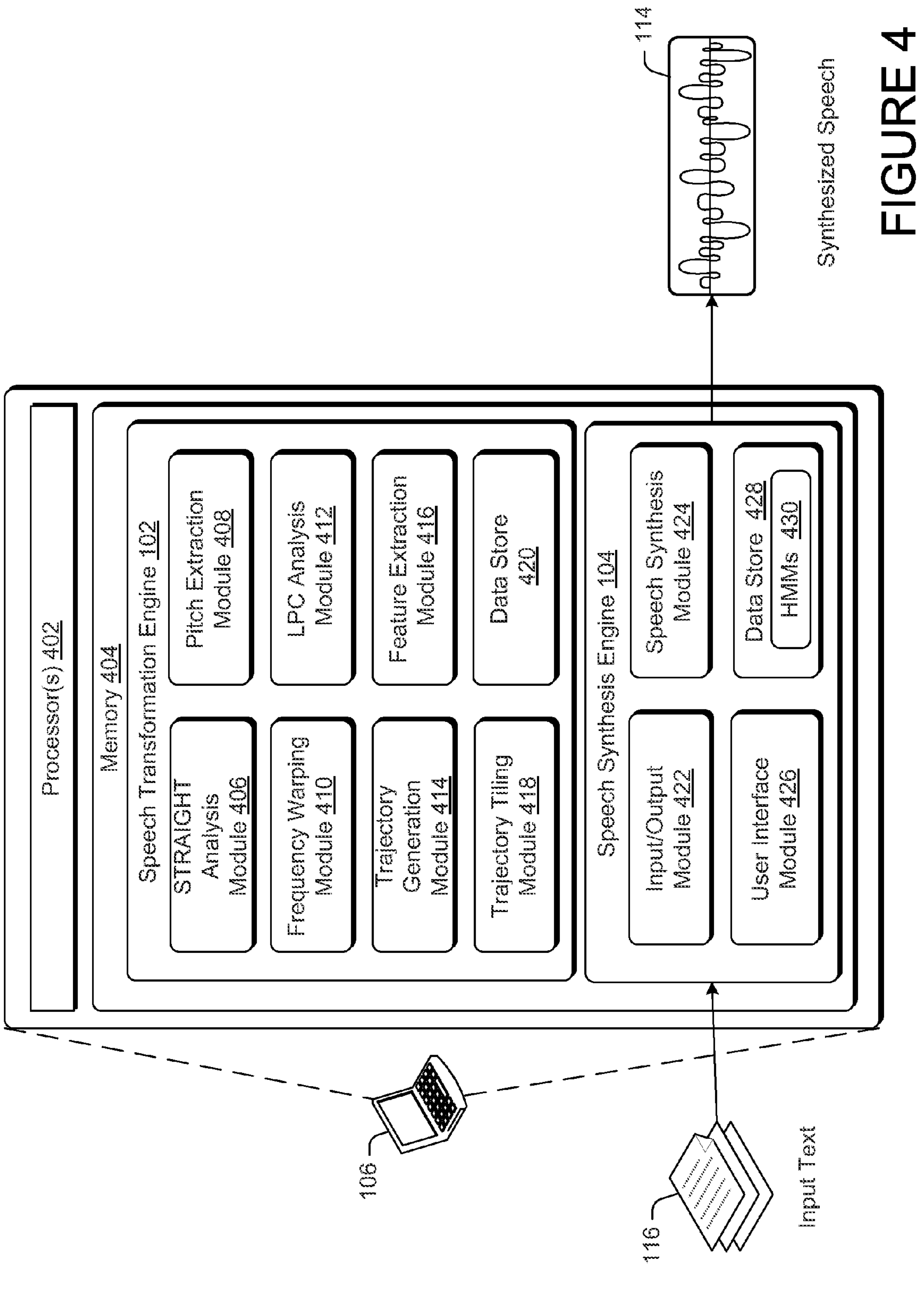
FIG. 4 is a block diagram that illustrates selected components of the speech transformation engine and selected components of the speech synthesis engine.

FIG. 4 is a block diagram that illustrates selected components of the speech transformation engine 102 and selected components of the speech synthesis engine 104. In at least some embodiments, the example speech transformation engine 102 and the speech synthesis engine 104 may be jointed implemented on an electronic device 106. In various embodiments, the electronic device 106 may be one of an embedded system, a smart phone, a personal digital assistant (PDA), a digital camera, a global position system (GPS) tracking unit, and so forth. However, in other embodiments, the electronic device 106 may be a general purpose computer, such as a desktop computer, a laptop computer, a server, and so forth.

The electronic device 106 may includes one or more processors 402, memory 404, and/or user controls that enable a user to interact with the device. The memory 404 may be implemented using computer storage media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanism. As defined herein, computer storage media does not include communication media. Computer-readable media includes, at least, two types of computer-readable media, namely computer storage media and communications media.

The electronic device 106 may have network capabilities. For example, the electronic device 106 may exchange data with other electronic devices (e.g., laptops computers, servers, etc.) via one or more networks, such as the Internet. In some embodiments, the electronic device 106 may be substituted with a plurality of networked servers, such as servers in a cloud computing network.

The one or more processors 402 and memory 404 of the electronic device 106 may implement components of speech transformation engine 102 and the speech synthesis engine 104. The components of each engine, or modules, may include routines, programs instructions, objects, and/or data structures that perform particular tasks or implement particular abstract data types.

The components of the speech transformation engine 102 may include a STRAIGHT analysis module 406, a pitch extraction module 408, a frequency warping module 410, a LPC analysis module 412, a trajectory generation module 414, a feature extraction module 416, a trajectory tiling module 418, and a data store 420.

The STRAIGHT analysis module 406 may perform the STRAIGHT analysis 202 on the source speech waveforms 204 that are stored in the source speaker speech corpus 110 to estimate the LPC spectrums 206 corresponding to the source speech waveforms 204.

The pitch extraction module 408 may perform pitch extraction 208 on the source speech waveforms 204 to extract the fundamental frequencies 210 of the source speech waveforms 204.

The frequency warping module 410 performs a formant-based frequency warping 212 based on the fundamental frequencies 210 and the LPC spectrums 206 of the source speech waveforms 204. Formant frequency warping 212 may be implemented on the formants (i.e., spectral peaks of speech signals) of long vowels embodied in each of the waveforms 118 in the source speaker speech corpus 110 and a corresponding waveform of the waveforms 228 in the target speaker speech corpus 108. In other words, formant frequency warping 212 may equalized the vocal tracts of the source speaker that generated the source speaker speech corpus 110 and the target speaker that generated the target speaker speech corpus 108. As described above, formant-based frequency warping 212 may produce a transformed fundamental frequency 128 from a corresponding fundamental frequency 124, and a transformed LPC spectrum 216 from a corresponding LPC spectrum 206.

In various embodiments, the frequency warping module 410 may initially align vowel segments embedded in two similar sounding speech utterances from the source speaker speech corpus 110 and the target speaker speech corpus 108. Each of the vowel segments may be represented by a corresponding fundamental frequency and a corresponding LPC spectrum. For formant frequencies in the aligned vowel segments that are stationary, the frequency warping module 410 may then select stationary portions of the aligned vowel segments. In at least one embodiment, a segment length of 40 ms may be chosen and the formant frequencies may be averaged over all aligned vowel segments. However, different segment lengths may be used in other embodiments.

In some embodiments, the first four formants of the selected stationary vowel segments may be used to represent a speaker's formant space. Thus, to define a piecewise-linear frequency warping function for the source speaker and the target speaker, the frequency warping module 410 may use key mapping pairs as anchors. In at least one embodiments, the frequency warping module 410 may use four pairs of mapping formants $[F_i^s, F_i^t]$, i=1, . . . , 4, between the source speaker and the target speaker as key anchoring points. Additionally, the frequency warping module 410 may also use the frequency pairs [0, 0] and [8,000, 8,000] as the first and the last anchoring points. However, different numbers of anchoring points and/or different frequencies may be used by the frequency warping module 410 in other embodiments.

The frequency warping module 410 may also use linear interpolation to map a frequency between two adjacent anchoring points. Accordingly, example warping anchors and an example piece-wise linear interpolation function derived from mapped formants by the frequency warping module 410 is illustrated in FIG. 5.

Figure 5:
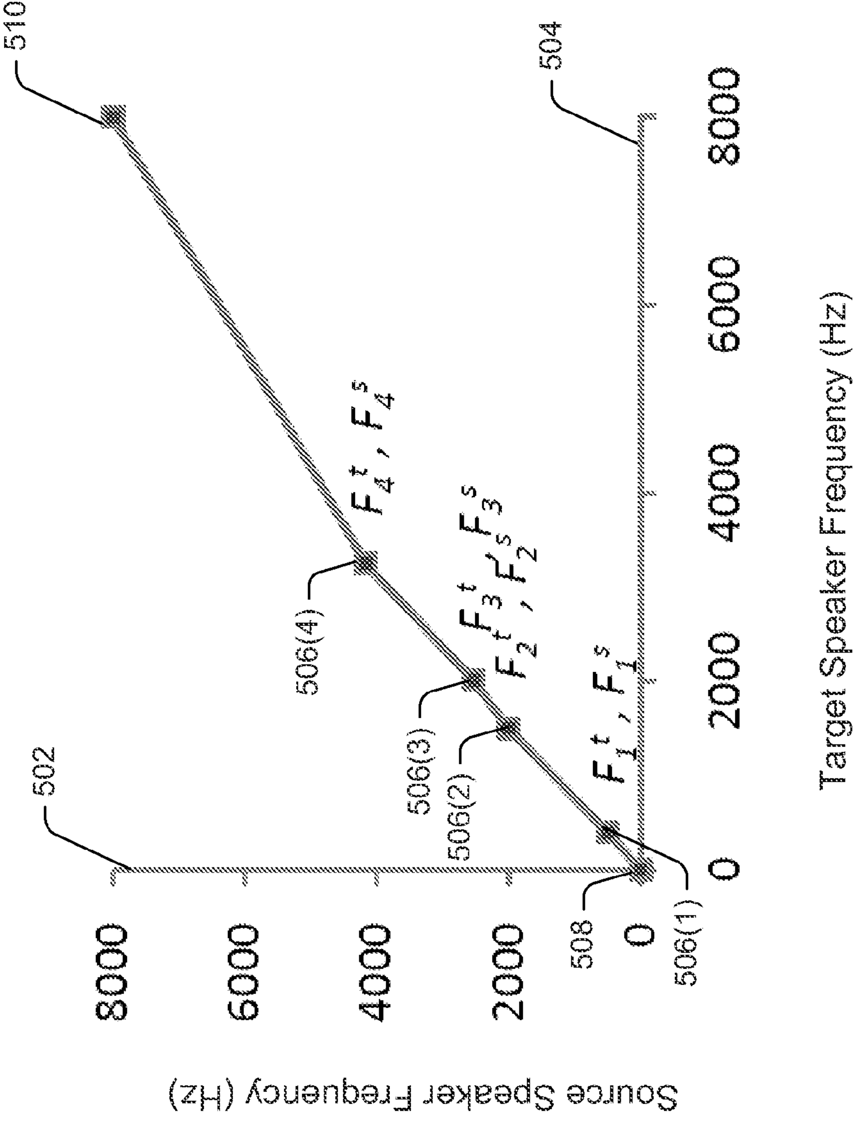
FIG. 5 illustrates example warping anchors and an example piece-wise linear interpolation function that are derived from mapped formants by a frequency warping module.

FIG. 5 illustrates example warping anchors and an example piece-wise linear interpolation function that are derived from mapped formant by a frequency warping module. Source speaker frequency is shown on the vertical axis 502, and the target speaker frequency is shown on the horizontal axis 504. The four anchoring points as used by the frequency warping module 410, which are anchor points 506(1), 506(2), 506(3), and 506(4), respectively, are illustrated in the context of the vertical axis 502 and the horizontal axis 504. Additionally, a first anchoring point [0, 0] 508 and a last anchoring point [8,000, 8000] 510 are also illustrated in FIG. 5.

Returning to FIG. 4, the frequency warping module 410 may use the piecewise-linear frequency warping function to warp the frequencies of an LPC spectrum for a particular frame of speech waveform according to equation (1), as follows:

$$\overline{s(w)}=s(f(w)) \tag{1}$$

in which s(w) is the LPC spectrum portion in a frame of the source speaker, f(w) is the warped frequency axis from the source speaker to the target speaker and $\overline{s(w)}$ is the warped LPC spectrum.

Further, the frequency warping module 410 may adjust a fundamental frequency portion ($F_0$) that corresponds to the LPC spectrum portion according to equation (2), as follows:

$$\hat{F0} = \frac{(F0_s - u_s)}{\sigma_s} \cdot \sigma_t + u_t \tag{2}$$

in which $u_s$, $u_t$, $\sigma_s$ and $\sigma_t$ are the means and the standard deviations of the fundamental frequencies of the source and the target speakers, respectively. Thus, After $F_0$ modification, the resultant $\hat{F0}$, that is, the transformed fundamental frequency for the LPC spectrum portion acquires the same statistical distribution as the corresponding speech data of the target speaker. In this way, by performing the above described piecewise-linear frequency warping function on all of the waveform frames in the source speaker speech corpus 110, the frequency warping module 410 may generated the transformed fundamental frequencies 214 and the transformed LPC spectrums 132.

The LPC analysis module 412 may perform the LPC analysis 218 on the transformed LPC spectrums 132 to generate corresponding linear spectrum pairs (LSPs) 220. Each of the LSPs 220 may possess the interpolation property of a corresponding LPC spectrum and also correlates well with the formants.

The trajectory generation module 414 may perform the trajectory generation 222 to generate warped parameter trajectories 224 based on the LSPs 220 and the transformed LPC spectrums 216. Accordingly, each of the transformed trajectories may encapsulate corresponding LSP and transformed fundamental frequency information.

The feature extraction module 416 may perform the feature extraction 226 to obtain fundamental frequencies 230, LSPs 232, and gains 234 for the frames in the target speech waveforms 228.

The trajectory tiling module 418 may perform trajectory tiling 236. During trajectory tiling 236, the trajectory tiling module 418 may use each of the warped parameter trajectories 224 as a guide to select frames of the target speech waveforms 228 from the target speaker speech corpus 108. Each frame from the target speech waveforms 228 may be represented by frame features that include a corresponding fundamental frequency 230, a corresponding LSP 232, and a corresponding gain 234.

The trajectory tiling module 418 may use a distance between a transformed parameter trajectory 224 and a corresponding parameter trajectory from the target speaker speech corpus 108 to select frame candidates for the transformed parameter trajectory. Thus, the distances of these three features per each frame of a target speech waveform 228 to the corresponding transformed parameter trajectory 224 may be defined in equations (3), (4), (5), and (6) by:

$$d_{F0} = |\log(F0_t) - \log(F0_c)| \tag{3}$$

$$d_G = |\log(G_t) - \log(G_c)| \tag{4}$$

$$d_\omega = \sqrt{\frac{1}{I}\sum_{i=1}^{I} w_i(\omega_{t,i} - \omega_{c,i})^2} \tag{5}$$

$$w_i = \frac{1}{\omega_{t,i} - \omega_{t,i-1}} + \frac{1}{\omega_{t,i+1} - \omega_{t,i}} \tag{6}$$

in which the absolute value of $F_0$ and gain difference in log domain between a target frame $F_{0t}$ in a transformed parameter trajectory, $G_t$ and a candidate frame $F_{0c}$ from the target speech waveforms, $G_c$ are computed, respectively. It is an intrinsic property of LSPs that clustering of two or more LSPs creates a local spectral peak and the proximity of clustered LSPs determines its bandwidth. Therefore, the distance between adjacent LSPs may be more critical than the absolute value of individual LSPs. Thus, the inverse harmonic mean weighting (IHMW) function may be used for vector quantization in speech coding or directly applied to spectral parameter modeling and generation.

The trajectory tiling module 418 may compute the distortion of LSPs by a weighted root mean square (RMS) between I-th order LSP vectors of the target frame $\omega_t=[\omega_{t,1}, \ldots, \omega_{t,1}]$ and a candidate frame $\omega_c=[\omega_{c,1}, \ldots, \omega_{c,1}]$, as defined in equation (5), where $w_i$ is the weight for i-th order LSPs and defined in equation (6). In some embodiments, the trajectory tiling module 418 may only use the first I LSPs out of the N-dimensional LSPs since perceptually sensitive spectral information is located mainly in the low frequency range below 4 kHz.

The distance between a target frame $u_t$ of the speech parameter trajectory 126 and a candidate frame $u_c$ maybe defined in equation (7), where $\bar{d}$ is the mean distance of constituting frames. Generally, different weights may be assigned to different feature distances due to their dynamic range difference. To avoid the weight tuning, the trajectory tiling module 418 may normalize the distances of all features to a standard normal distribution with zero mean and a variance of one. Accordingly, the resultant normalized distance may be shown in equation (8) as follows:

$$d(u_t,u_c)=N(\bar{d}_{F0})+N(\bar{d}_G)+N(\bar{d}_\omega) \tag{7}$$

Thus, by applying the equations (3)-(7) described above, the trajectory tiling module 418 may select frames of the target speech waveform 228 for each of the warped parameter trajectories 224. Further, after selecting frames for a particular transformed parameter trajectory 224, the trajectory tiling module 418 may concatenate the selected frames together to produce a corresponding waveform.

In this way, by repeating the above described operations for each of the warped parameter trajectories 224, the trajectory tiling module 418 may produce transformed speech waveforms 238 that constitute the transformed target speaker speech corpus 112. As described above, the transformed target speaker speech corpus 112 may acquire the voice characteristics of the first language (L1), even though the original target speaker speech corpus 108 has the voice characteristics of a second language (L2).

The data store 420 may store the source speaker speech corpus 110, the target speaker speech corpus 108, and the transformed target speaker speech corpus 112. Additionally, the data store 420 may store various intermediate products that are generated during the transformation of the target speaker speech corpus 108 into the transformed target speaker speech corpus 112. Such intermediate products may include fundamental frequencies, LPC spectrums, gains, transformed fundamental frequencies, transformed LPC spectrums, warped parameter trajectories, and so forth.

The components of the speech synthesis engine 104 may include an input/output module 422, a speech synthesis module 424, a user interface module 426, and a data store 428.

The input/output module 422 may enable the speech synthesis engine 104 to directly access the transformed target speaker speech corpus 112 and/or store the transformed target speaker speech corpus 112 in the data store 428. The input/output module 422 may further enable the speech synthesis engine 104 to receive input text 116 from one or more applications on the electronic device 106 and/or another device. For example, but not as a limitation, the one or more applications may include a global positioning system (GPS) navigation application, a dictionary application, a language learning application, a speech-to-speech translation application, a text messaging application, a word processing application, and so forth. Moreover, the input/output module 422 may provide the synthesized speech 114 to audio speakers for acoustic output, or to the data store 428.

The speech synthesis module 424 may produce synthesize speech 114 from the input text 116 by using the transformed target speaker speech corpus 112 stored in the data store 428. In various embodiments, the speech synthesis module 424 may perform HMM-based text-to-speech synthesis, and the transformed target speaker speech corpus 112 may used to train the HMMs 430 that are used by the speech synthesis module 424. The synthesized speech 114 may resemble natural speech spoken by the target speaker, but which has the voice characteristics of the first language (L1), despite the fact that the target speaker does not have the ability to speak the first language (L1).

The user interface module 426 may enable a user to interact with the user interface (not shown) of the electronic device 106. In some embodiments, the user interface module 426 may enable a user to input or select the input text 116 for conversion into the synthesized speech 114, such as by interacting with one or more applications.

The data store 428 may store the transformed target speaker speech corpus 112 and the trained HMMs 430. The data store 428 may also the input text 116 and the synthesized speech 114. The input text 116 may be in various forms, such as text snippets, documents in various formats, downloaded web pages, and so forth. In the context of language learning software, the input text 116 may be text that has been pre-translated. For example, the language learning software may receive a request from an English speaker to generate speech that demonstrates pronunciation of the Spanish equivalent of the word “Hello”. In such an instance, the language learning software may generate input text 116 in the form of the word “Hola” for synthesis by the speech synthesis module 424.

The synthesized speech 114 may be stored in any audio format, such as WAV, mp3, etc. The data store 428 may also store any additional data used by the speech synthesis engine 104, such as various intermediate products produced during the generation of the synthesized speech 114 from the input text 116.

While the speech transformation engine 102 and the speech synthesis engine 104 are illustrated in FIG. 4 as being implemented on the electronic device 106, the two engines may be implemented on separate electronic devices in other embodiments. For example, the speech transformation engine 102 may be implemented on an electronic device in the form of a server, and the speech synthesis engine 104 may be implemented on an electronic device in the form of a smart phone.

Example Processes

Figure 6:
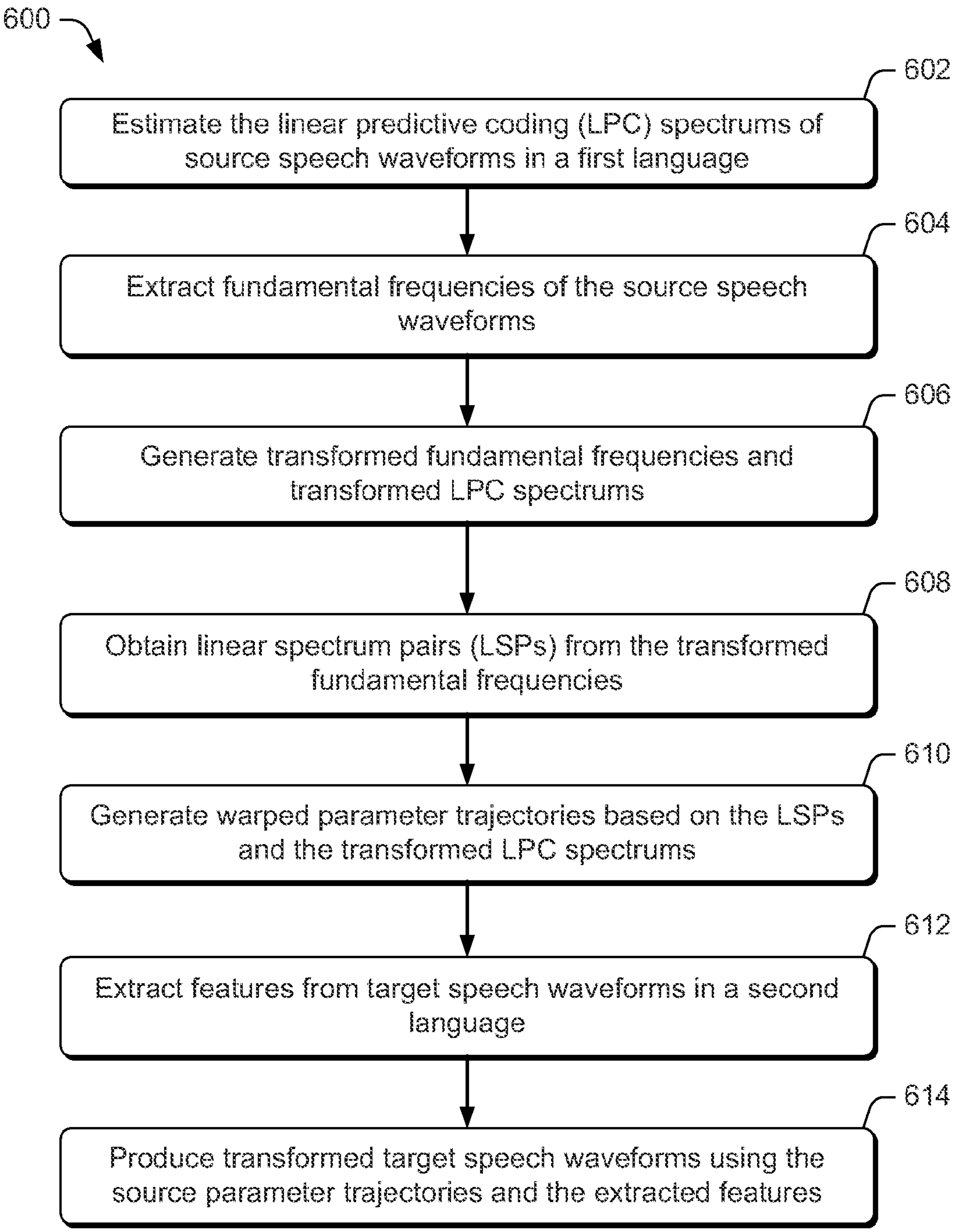
FIG. 6 is a flow diagram that illustrates an example process to produce a transformed target speaker speech corpus that acquires the voice characteristics of a different language based on a source speaker speech corpus.
Figure 7:
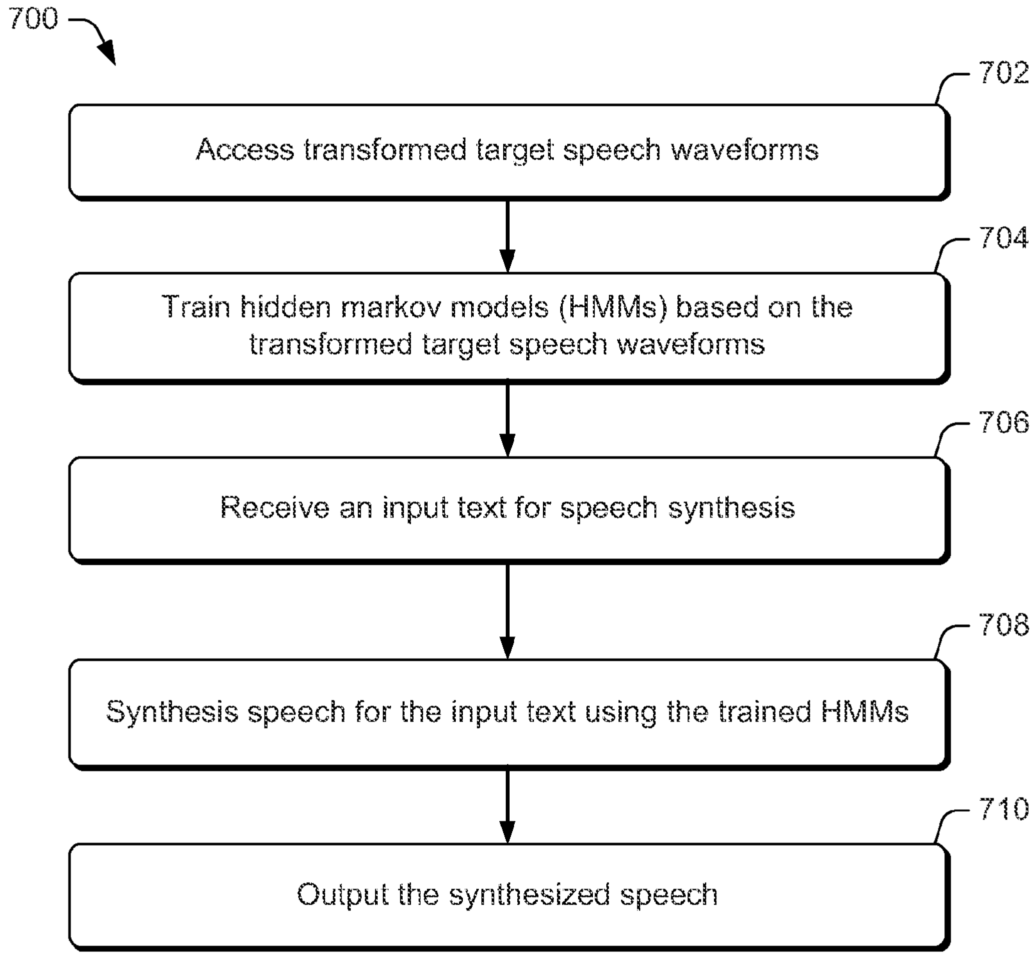
FIG. 7 is a flow diagram that illustrates an example process to synthesize speech for an input text using the transformed target speaker speech corpus.

FIGS. 6-7 describe various example processes for implementing the frame mapping-based approach for cross-lingual voice transformation. The order in which the operations are described in each example process is not intended to be construed as a limitation, and any number of the described blocks can be combined in any order and/or in parallel to implement each process. Moreover, the blocks in the FIGS. 6-7 may be operations that can be implemented in hardware, software, and a combination thereof. In the context of software, the blocks represent computer-executable instructions that, when executed by one or more processors, cause one or more processors to perform the recited operations. Generally, computer-executable instructions include routines, programs, objects, components, data structures, and so forth that cause the particular functions to be performed or particular abstract data types to be implemented.

FIG. 6 is a flow diagram that illustrates an example process 600 to produce a transformed target speaker speech corpus that of a particular language that acquires the voice characteristics of a source language based on a source speaker speech corpus.

At block 602, the STRAIGHT analysis module 406 of the speech transformation engine 102 may perform STRAIGHT analysis to estimate the linear predictive coding (LPC) spectrums 206 of source speech waveforms 204 that are in the source speaker speech corpus 110. The source speech waveforms 204 are in a first language (L1).

At block 604, the pitch extraction module 408 may perform the pitch extraction 208 to extract the fundamental frequencies 210 of the source speech waveforms 204). At block 606, the frequency warping module 410 may perform the formant-based frequency warping 212 on the LPC spectrums 206 and the fundamental frequencies 210 to produce transformed fundamental frequencies 214 and the transformed LPC spectrums 216.

At block 608, the LPC analysis module 412 may perform the LPC analysis 218 to obtain linear spectrum pairs (LSPs) 220 from the transformed fundamental frequencies 214. At block 610, the trajectory generation module 414 may perform trajectory generation 222 to generate warped parameter trajectories 224 based on the LSPs 220 and the transformed LPC spectrums 216.

At block 612, the feature extraction module 416 may perform feature extraction 226 to extract features from the target speech waveforms 228 of the target speaker speech corpus 108. The target speech waveforms 228 may be in a second language (L2). In various embodiments, the extracted features may include fundamental frequencies 230, LSPs 232, and gains 234.

At block 614, the trajectory tiling module 418 may perform trajectory tiling 236 to produce transformed speech waveforms 238 based on the warped parameter trajectories 224 and the extracted features of the target speech waveforms 228. The transformed speech waveforms 238 may acquire the voice characteristics of the first language (L1) despite the fact that the transformed speech waveforms 238 are derived from the target speech waveforms 228 of the second language (L2). In various embodiments, the trajectory tiling module 418 may use each of the warped parameter trajectories 224 as a guide to select frames of the target speech waveforms 228 from the target speaker speech corpus 108. Each frame from the target speech waveforms 228 may be represented by frame features that include a corresponding fundamental frequency 230, a corresponding LSP 232, and a corresponding gain 234. Subsequently, the transformed target speaker speech corpus 112 that includes the transformed speech waveforms 238 may be outputted and/or stored in the data store 420.

FIG. 7 is a flow diagram that illustrates an example process 700 to synthesize speech for an input text using the transformed target speaker speech corpus.

At block 702, the speech synthesis engine 104 may use the input/output module 422 to access the transformed target speaker speech corpus 112. At block 704, the speech synthesis module 424 may train a set of hidden markov models (HMMs) 430 based on the transformed target speaker speech corpus 112.

At block 706, the speech synthesis engine 104 may receive an input text via the input/output module 422. The input text 116 may be in various forms, such as text snippets, documents in various formats, downloaded web pages, and so forth.

At block 708, the speech synthesis module 424 may use the HMMs 430 that are trained using the transformed target speaker speech corpus 112 to generate synthesized speech 114 from the input text 116. The synthesized speech 114 may be outputted to an acoustic speaker and/or the data store 428.

The implementation of frame mapping-based approach to cross-lingual voice transformation may enable a speech-to-speech translation engine or a text-to-speech engine to synthesize natural sounding output speech that has the voice characteristics of a second language spoken by a target speaker, but which is recognizable as being similar to an input speech spoken by a source speaker in a first language. As a result, user satisfaction with electronic devices that employ such engines may be enhanced.

CONCLUSION

In closing, although the various embodiments have been described in language specific to structural features and/or methodological acts, it is to be understood that the subject matter defined in the appended representations is not necessarily limited to the specific features or acts described. Rather, the specific features and acts are disclosed as exemplary forms of implementing the claimed subject matter.

The invention claimed is:

1. A computer-readable memory storing computer-executable instructions that, when executed, cause one or more processors to perform acts comprising:

performing formant-based frequency warping on fundamental frequencies and linear predictive coding (LPC) spectrums of source speech waveforms in a first language to produce transformed fundamental frequencies and transformed LPC spectrums;

generating warped parameter trajectories based at least on the transformed fundamental frequencies and the transformed LPC spectrums; and producing transformed target speech waveforms with voice characteristics of the first language that retain at least some voice characteristics of a target speaker using the warped parameter trajectories and features from target speech waveforms of the target speaker in a second language.

2. The computer-readable memory of claim 1, further comprising instructions that, when executed, cause the one or more processors to perform an act of generating synthesized speech for an input text using the transformed target speech waveforms.

3. The computer-readable memory of claim 2, instructions that, when executed, cause the one or more processors to perform an act of estimating the LPC spectrums of the source speech waveforms using a Speech Transformation and Representation using Adaptive Interpolation of Weighted Spectrum (STRAIGHT) speech analysis.

4. The computer-readable memory of claim 1, further comprising instructions that, when executed, cause the one or more processors to perform an act of extracting the fundamental frequencies of the source speech waveforms using pitch extraction.

5. The computer-readable memory of claim 1, further comprising instructions that, when executed, cause the one or more processors to perform an act of obtaining linear spectrum pairs (LSPs) from the transformed LPC spectrums, wherein the generating further includes generating the warped parameter trajectories base at least on the transformed LPC spectrums and the LSPs that encapsulate the transformed LPC spectrums.

6. The computer-readable memory of claim 1, further comprising instructions that, when executed, cause the one or more processors to perform an act of extracting the features that include fundamental frequencies, LSPs, and gains from the target speech waveforms.

7. The computer-readable memory of claim 1, wherein the performing includes performing the formant-based frequency warping by:

aligning vowel segments embedded in a pair of speech utterances from a source speaker and a target speaker;

selecting stationary portions of a predefined length from the aligned vowel segments; and defining a piece-wise linear interpolation function to warp the LPC spectrums based at least on a plurality of mapped formant pairs in the stationary portions, each mapped formant pair including a frequency anchor point for the source speaker and a frequency anchor point for the target speaker.

8. The computer-readable memory of claim 1, wherein each frame of the transformed target speech waveforms in represented by a corresponding fundamental frequency, a corresponding LSP, and a corresponding gain, and wherein the producing the transformed target speech waveforms further includes:

selecting candidate frames of the target speech waveforms for a warped parameter trajectory based at least on distances between target frames in the warped parameter trajectory and the candidate frames; and concatenating the selected candidate frames to form a target speech waveform.

9. The computer-readable memory of claim 1, wherein the source speech waveforms are stored in a source speaker speech corpus, further comprising instructions that, when executed, cause the one or more processors to perform an act of storing the transformed target speech waveforms in a transformed target speaker speech corpus.

10. A computer-implemented method, comprising:

under control of one or more computing systems configured with executable instructions, performing formant-based frequency warping on fundamental frequencies and coding spectrums of source speech waveforms in a first language to produce transformed fundamental frequencies and transformed coding spectrums;

generating warped parameter trajectories based at least on the transformed fundamental frequencies and the transformed coding spectrums; and producing transformed target speech waveforms with voice characteristics of the first language that retain at least some voice characteristics of a target speaker using the warped parameter trajectories and features from target speech waveforms of the target speaker in the second language;

training models based at least on the transformed speech target waveforms; and generating synthesized speech for an input text using the trained models.

11. The computer-implemented method of claim 10, further comprising receiving input text from a text-to-speech application or a language translation application.

12. The computer-implemented method of claim 10, further comprising:

estimating the coding spectrums of the source speech waveforms using a Speech Transformation and Representation using Adaptive Interpolation of Weighted Spectrum (STRAIGHT) speech analysis;

extracting the fundamental frequencies of the source speech waveforms using pitch extraction; and obtaining linear spectrum pairs (LSPs) from the transformed coding spectrums, wherein the generating further includes generating the warped parameter trajectories base at least on the transformed coding spectrums and the LSPs.

13. The computer-implemented method of claim 10, wherein the performing includes performing the formant-based frequency warping by:

aligning vowel segments embedded in a pair of speech utterances from a source speaker and a target speaker;

selecting stationary portions of a predefined length from the aligned vowel segments; and defining a piece-wise linear interpolation function to warp the coding spectrums based at least on a plurality of mapped formant pairs in the stationary portions, each mapped formant pair including a frequency anchor point for the source speaker and a frequency anchor point for the target speaker.

14. The computer-implemented method of claim 10, further comprising extracting the features that include fundamental frequencies, LSPs, and gains from the target speech waveforms.

15. The computer-implemented method of claim 14, wherein each frame of the transformed target speech waveforms in represented by a corresponding fundamental frequency, a corresponding LSP, and a corresponding gain, and wherein the producing the transformed target speech waveforms further includes:

selecting candidate frames of the target speech waveforms for a warped parameter trajectory based at least on distances between target frames in the warped parameter trajectory and the candidate frames; and concatenating the selected candidate frames to form a target speech waveform.

16. A system, comprising:

one or more processors; and a memory that includes a plurality of computer-executable components, the plurality of computer-executable components comprising:

a frequency warping component to perform formant-based frequency warping on fundamental frequencies and coding spectrums of source speech waveforms in a first language to produce transformed fundamental frequencies and transformed coding spectrums;

a trajectory generation component to generate warped parameter trajectories based at least on the transformed fundamental frequencies and the transformed coding spectrums; and a trajectory tiling component to produce transformed target speech waveforms with voice characteristics of the first language that retain at least some voice characteristics of a target speaker using the warped parameter trajectories and features from target speech waveforms of the target speaker in the second language.

17. The system of claim 16, further comprising:

a Speech Transformation and Representation using Adaptive Interpolation of Weighted Spectrum (STRAIGHT) analysis component to estimate the coding spectrums of the source speech waveforms;

a pitch extraction component to extract fundamental frequencies of the source speech waveforms using pitch extraction; and a feature extraction component to extract the features that include fundamental frequencies, LSPs, and gains from the target speech waveforms.

18. The system of claim 16, further comprising a speech synthesis component to generating synthesized speech for an input text using hidden markov models (HMMs) trained with the transformed target speech waveforms.

19. The system of claim 16, further comprising a LPC analysis component to obtain linear spectrum pairs (LSPs) from the transformed LPC spectrums, wherein the frequency warping component is to perform the formant-based frequency warping by:

aligning vowel segments embedded in a pair of speech utterances from a source speaker and a target speaker;

selecting stationary portions of a predefined length from the aligned vowel segments; and defining a piece-wise linear interpolation function to warp the LPC spectrums based at least on a plurality of mapped formant pairs in the stationary portions, each mapped formant pair including a frequency anchor point for the source speaker and a frequency anchor point for the target speaker.

20. The system of claim 16, wherein each frame of the transformed target speech waveforms in represented by a corresponding fundamental frequency, a corresponding LSP, and a corresponding gain, and wherein the trajectory tiling component is to produce the transformed target speech waveforms by:

selecting candidate frames of the target speech waveforms for a warped parameter trajectory based at least on distances between target frames in the warped parameter trajectory and the candidate frames; and concatenating the selected candidate frames to form a target speech waveform.

* * * * *